United States Patent [19] 3,689,881
Hayashi [45] Sept. 5, 1972

[54] DEVICE IN AN AUTOMOBILE FOR DETECTING A PULL-OUT MOTION OF A SEAT BELT

[72] Inventor: Yoshihiro Hayashi, Kasugai, Japan

[73] Assignee: Kabushiki Kaisha Tokai Rika Denki Seisakusho, Nishikasugai-gun, Aichi-Prefecture, Japan

[22] Filed: Jan. 14, 1971

[21] Appl. No.: 106,475

[30] Foreign Application Priority Data

Jan. 21, 1970    Japan ........................45/6233

[52] U.S. Cl...........340/52 E, 180/82.8, 200/61.58 B, 307/10 SB
[51] Int. Cl. .............................................B60q 1/00
[58] Field of Search..........340/52 E, 278; 307/10 SB; 200/61.58 B; 180/82, 82.8; 280/150 SB

[56] References Cited

UNITED STATES PATENTS 3,504,336   3/1970   Boblitz ......................180/82.8
3,506,305   4/1970   Eineman, Jr. et al. ...340/52 E Primary Examiner—Alvin H. Waring
Assistant Examiner—Glen R. Swann, III
Attorney—Woodhams, Blanchard and Flynn

[57] ABSTRACT

A device in an automobile for detecting a pullout motion of a seat belt characterized in that there is provided a spring case rotatably receiving a belt winding shaft and encasing therein a coil spring, one end of which is engaged with a hooked portion formed in the inner peripheral wall of said spring case and the other end of which is fixed to said winding shaft so that the coil spring is tightened when a seat belt is pulled out. The spring case is further provided with a fixed electric contact on its inner peripheral wall. Said fixed electric contact forms an electrical switch in combination with a coil spring which serves as a movable electric contact and is adapted to be detached from the fixed contact when the spring is tightened, and thus the switch is cut off.

The present device can effectively detect the pull-out motion of the seat belt and call upon an occupant to put on the seat belt when it is not yet pulled out.

5 Claims, 2 Drawing Figures

PATENTED SEP 5 1972
3,689,881
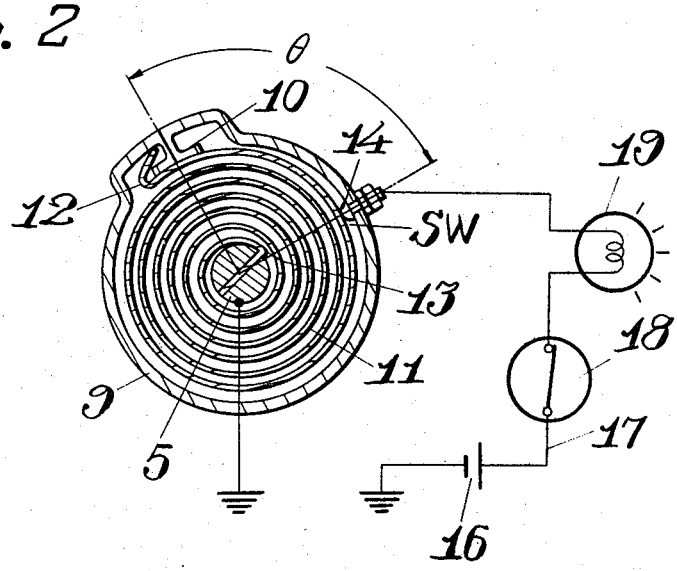
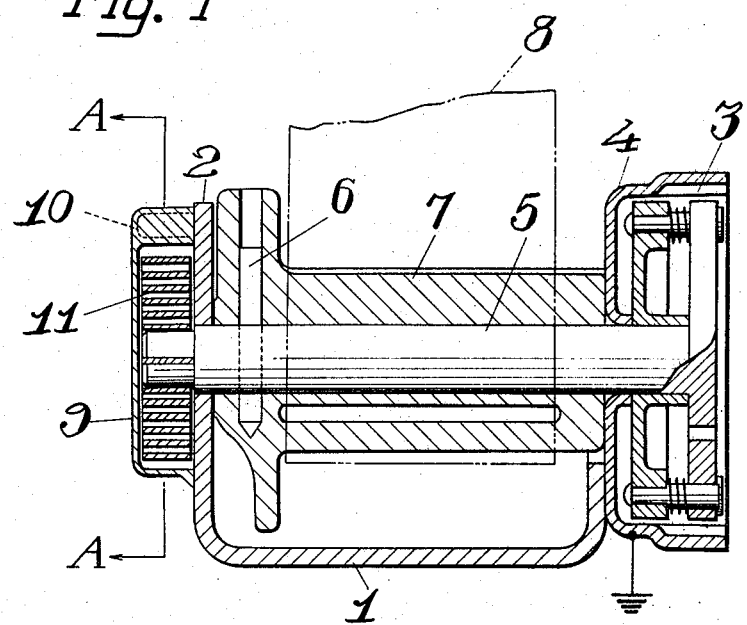
INVENTOR
YOSHIHIRO HAYASHI
BY Woodhams, Blanchard & Flynn
ATTORNEYS

DEVICE IN AN AUTOMOBILE FOR DETECTING A PULL-OUT MOTION OF A SEAT BELT

BACKGROUND OF THE INVENTION

This invention relates to a device in an automobile for detecting a pull-out motion of a seat belt and, more particularly to a device for detecting and indicating the state of a seat belt whether the same is pulled out of a belt winding frame and put on by an occupant who is seated in an automobile.

Therefore, it is an object of the present invention to provide a device in an automobile for detecting a pull-out motion of a seat belt which can easily and surely detect the state of the seat belt and urge an occupant seated in an automobile to put on said seat belt until the same is pulled out.

It is another object of the present invention to provide a device in an automobile for detecting a pull-out motion of a seat belt which can effect on and off operations of a switch according to the desired length of a pulled out portion of the seat belt.

SUMMARY OF THE INVENTION

Essentially, according to this invention, there is provided a device in an automobile for detecting a pull-out motion of a seat belt which comprises a spring case having a hooked portion formed on its inner peripheral wall and encasing a coil spring; a belt winding shaft rotatably received by said spring case; said coil spring having its one end engaged with said hooked portion and the other end fixed to said winding shaft; a fixed electric contract mounted on the inner peripheral wall of said spring case and positioned at a central angle of $\theta$ from said hooked portion, said fixed contact forming an electrical switch in combination with said coil spring serving as a movable electric contact; and lead wires drawn out of said fixed contact and said winding shaft to form an electric circuit, said electric circuit being connected to a potential source and provided with an ignition switch and a warning means.

The foregoing and other objects, features and advantages of this invention will be made apparent from the following detailed description of one embodiment of this invention taken in connection with the accompanying drawings;

BRIEF DESCRIPTION OF THE DRAWINGS

FIG. 1 is a vertical-sectional front view of a belt winding frame; and

FIG. 2 is a vertical-sectional side view of the same showing the substantial portion thereof taken along the line A—A in FIG. 1.

DETAILED DESCRIPTION

Referring now to the drawings, there is illustrated a device in an automobile for detecting a pull-out motion of a seat belt. Numeral 1 designates a belt winding frame made of a plastic having at its one end a metallic supporting member 4 of a bowl-like shape which is equipped with an engageable cog train on its interior face. Numeral 5 designates a belt winding shaft rotatably supported between said bowl-like supporting member 4 and a supporting wall 2 traversingly at their respective middle portions. A belt 8 is secured with its one end fixed to a belt winding drum 7 which is fitted around the shaft 5 and secured with a pin 6. Numeral 9 designates a bowl-like spring case fitted to the outer face of said supporting wall 2 and into said spring case 9, the shaft 5 rotatably extends. Numeral 11 is a coil spring with its one end 12 engaged with a hooked portion 10 formed on an inner peripheral wall of the spring case 9 and the other end 13 inserted and fitted into a notch formed at the extending end of the shaft 5. Numeral 14 is a fixed electric contact mounted on the inner peripheral wall of said case 9 apart from said hooked portion 10 at a central angle of $\theta$ so as to contact with the outermost part of the spring 11 which serves as a movable electric contact. Said fixed contact 14 as a fixed electric contact and said spring 11 as a movable electric contact form an electrical switch Sw in combination.

When the spring case 9 is made of a metal, the fixed contact 14 should be mounted thereon through an insulator.

In the device according to the present invention, lead wires are drawn out of the fixed contact 14 and the belt winding shaft 5 as depicted in FIG. 2 (or out of the bowl-like supporting member 4 as depicted in FIG. 1) and connected to a potential source 16 to form a warning circuit 17. In said circuit 17 are an ignition switch 18, a warning means 19 such as a lamp, a buzzer etc. and the switch Sw provided.

As the present device has such a construction as set forth hereinabove, when the belt 8 is pulled out of the winding frame 1, the coil spring 11 is tightened or contracted to detach its outermost part from the fixed contact 14, thereby to cut off the switch Sw. The cut-off operation of the switch Sw in relation to the length of the pulled out portion of the belt 8 is determined depending upon $\theta$, the central angle showing the location of the fixed contact 14 setting the base point at the hooked portion 10. Therefore, until the belt 8 is pulled out, the switch Sw remains conductive and keeps the warning means 19 in operation, thereby calling upon the occupant to put on the seat belt.

This invention is, as described hereinabove, characterized in its switch construction where the coil spring serves as a movable electric contact and a simple and steady operation of the switch can be assured. Moreover, it has another advantage that the switch is operated according to the desired length of the pulled out portion of the seat belt by varying the location of the fixed contact 14.

What is claimed is:

1. A device in an automobile for detecting a pullout motion of a seat belt which comprises: a spring case having a hooked portion formed on its inner peripheral wall and encasing a coil spring; a belt winding shaft rotatably received by said spring case; said coil spring having its one end engaged with said hooked portion and the other end fixed to said winding shaft; a fixed electric contact mounted on the inner peripheral wall of said spring case, said fixed contact and said coil spring forming an electric switch, with said coil spring serving as a movable electric contact; lead wires drawn out of said fixed contact and said winding shaft; a warning means, and electric circuit means connecting said lead wires and said warning means to a potential source.

2. The device of claim 1 including switch means connected to said electrical circuit for preventing actuation of said warning means by said electrical switch.

3. The device of claim 2 in which said switch means is an ignition switch.

4. The device of claim 1 in which said warning means, lead wires, fixed contact and coil spring are connected in series loop with said potential source and including a further switch interposed in said loop for disabling said warning means.

5. The device of claim 1 in which the seat belt is secured at one end thereof to said belt winding shaft.

* * * * *